United States Patent [19]
Suzuki et al.

[11] Patent Number: 5,587,235
[45] Date of Patent: Dec. 24, 1996

[54] MAGNETIC RECORDING MEDIUM AND MAGNETIC RECORDING APPARATUS

[75] Inventors: Hiroyuki Suzuki, Odawara; Naoki Kodama, Kamakura; Takao Yonekawa, Odawara; Tokuho Takagaki, Hiratsuka; Naoto Endo, Odawara; Katsuo Abe, Hiratsuka; Tsuneo Suganuma, Tokorozawa, all of Japan

[73] Assignee: Hitachi, Ltd., Tokyo, Japan

[21] Appl. No.: 193,376

[22] Filed: Feb. 8, 1994

[30] Foreign Application Priority Data

Feb. 19, 1993  [JP]  Japan ................................ 5-030632
Feb. 19, 1993  [JP]  Japan ................................ 5-030633

[51] Int. Cl.⁶ .............................. G11B 5/66; B32B 5/16
[52] U.S. Cl. .................... 428/332; 428/336; 428/611; 428/678; 428/694 T; 428/694 TS; 428/694 TM; 428/694 R; 428/900; 360/103; 360/106; 360/113

[58] Field of Search ...................... 428/694 T, 694 R, 428/694 TS, 694 TM, 611, 678, 332, 336, 900; 360/103, 113, 106

[56] References Cited

U.S. PATENT DOCUMENTS

| | | | |
|---|---|---|---|
| 4,677,032 | 6/1987 | Robinson | 428/611 |
| 4,748,089 | 5/1988 | Kumasaka | 428/635 |
| 4,749,628 | 6/1988 | Ahlert | 428/660 |
| 4,775,576 | 10/1988 | Bouchand | 428/216 |
| 4,798,765 | 1/1989 | Ishizaka | 428/336 |
| 4,863,811 | 9/1989 | Ueda | 428/694 TP |
| 5,034,286 | 7/1991 | Nasu | 428/694 TM |
| 5,051,288 | 9/1991 | Ahlert | 428/65.7 |
| 5,176,965 | 1/1993 | Mallary | 428/694 BM |
| 5,227,212 | 7/1993 | Ahlert | 360/87.01 |
| 5,290,629 | 3/1994 | Kobayashi | 428/65.7 |
| 5,316,631 | 5/1994 | Ando | 204/192.2 |
| 5,370,928 | 12/1994 | Funabashi | 428/336 |

FOREIGN PATENT DOCUMENTS

| | | |
|---|---|---|
| 1173313 | 7/1989 | Japan . |
| 1217723 | 8/1989 | Japan . |
| 3283016 | 12/1991 | Japan . |

OTHER PUBLICATIONS

IEEE Transactions on Magnetics, vol. 23, No. 1, Jan. 1987 pp. 122–124.
IEEE Transactions on Magnetics, vol. 26, No. 5, Sep. 1990, pp. 2706–2708.

Primary Examiner—Leszek Kiliman
Attorney, Agent, or Firm—Kenyon & Kenyon

[57] ABSTRACT

A magnetic recording medium and magnetic recording apparatus which can provide a high output level and a low noise level are disclosed. A magnetic recording medium includes a multilayer structure of magnetic alloy thin films containing Co, and at least one paramagnetic intermediate region or oxygen-rich region disposed between the magnetic layers. The intermediate region reduces the magnetic interaction between the magnetic layers without the degradation of crystallinity of the magnetic layers. As a result, a magnetic recording medium having such a structure shows low noise performance and a high recording density.

17 Claims, 5 Drawing Sheets

MAGNETIC RECORDING MEDIUM AND MAGNETIC RECORDING APPARATUS

BACKGROUND OF THE INVENTION

1. Field of the Invention

The present invention relates to a magnetic thin film recording medium and to a magnetic recording apparatus using it. More specifically, the present invention relates to a magnetic thin film recording medium and a recording apparatus which provide low noise performance and a high recording density.

2. Description of the Related Art

There have been proposed some materials for a recording medium which can provide a high recording density, including a Co alloy film coated on a pure Cr film and a Co—Ni—Pt based thin film. Some of these proposed media are in actual use. One cobalt based alloy (hereinafter referred to as Co-based alloy) magnetic thin film is a Co—Cr—Ta alloy thin film as disclosed, for example, in IEEE Transaction on Magnetics, Vol. 23, p. 122 (1987).

A thin film medium comprising a magnetic layer having a multi-layer structure has also been proposed to achieve higher output signals during reproducing (Japanese Patent Application Laid-Open No. 1-173313, Japanese Patent Application Laid-Open No. 1-217723). If a multilayer structure comprising magnetic layers and non-magnetic layers are formed by using a Co-based alloy containing Ni or a Co—Pt alloy, it is possible to obtain a higher output signal level in reproduction.

However, as described in Japanese Patent Application Laid-Open No. 3-283016, these media have a disadvantage that the noise level and bit shifting resulting from transition regions between adjacent recording bits are greater than those of conventional coated-type media. To achieve a high recording density using this type of medium, it is required to improve noise performance and to reduce bit shifting. One proposed technique to achieve this requirement is to form a magnetic recording medium having a multilayer structure provided alternately with both of Co—Cr—Ta alloy magnetic thin films and Cr alloy non-magnetic thin films.

In the case where a Co—Cr—Pt alloy is used as a material for the magnetic layers of the multilayer structure, if the number of non-magnetic layers disposed between the magnetic layers is increased while the thickness of the magnetic layers is made constant, then the noise level will be reduced, as described in IEEE Transaction on Magnetics, Vol. 26, p. 2706 (1990).

However, in conventional magnetic recording media, it is required to form a non-magnetic intermediate layer. Therefore, after forming a non-magnetic underlying layer and a magnetic layer on it, at least one Cr alloy non-magnetic metal layer is formed and then a magnetic layer is formed on it. However, this structure has difficulty in reducing medium noise in high density recording. As a result, a magnetic recording apparatus using this type of recording medium also has difficulty in increasing recording density per unit volume. Furthermore, the presence of non-magnetic intermediate layers causes an increase in the distance of a medium defined between a medium end portion confronting a magnetic head and the lower magnetic layer. Another problem is a long processing time required to form the medium. Furthermore, a number of sputtering chambers are required to form a plurality of non-magnetic intermediate layers, which results in a high cost.

SUMMARY OF THE INVENTION

The present invention provides a magnetic recording medium which can provide a high output level and a low noise level without degradation in crystal quality of the upper magnetic layer and without degradation in magnetostatic characteristics of the medium. The present invention also provides a magnetic recording medium which can provide a high output level and a low noise level without increasing a distance of a medium defined between a medium end portion confronting a magnetic head and the lower magnetic layer, and without increasing the processing time and the investment in production equipment, as opposed to conventional techniques. Present invention further provides a magnetic recording apparatus comprising a magnetic head and a magnetic recording medium achieving these three goals.

The inventors have discovered that, in a conventional magnetic recording medium of multi-layer thin film construction in which a non-magnetic intermediate layer having a crystal structure different from that of ferromagnetic layers is sandwiched between two adjacent magnetic layers, the crystallinity of the ferromagnetic alloy layer provided on the non-magnetic intermediate layer is deteriorated due to the existence of the non-magnetic intermediate layer having the crystal structure different from that of the ferromagnetic alloy layer, so that the magnetostatic characteristics of the recording medium are deteriorated. The magnetic recording medium of the present invention is achieved on the basis of this discovery.

In a first aspect of the present invention there is provided a magnetic recording medium including a substrate; a non-magnetic underlying layer formed on the substrate; a plurality of stacked magnetic alloy thin film layers containing Co and at least one additional component, the magnetic layers being formed on the non-magnetic underlying layer; and an intermediate region laminated on at least one magnetic layer which intermediate layer is provided by at least one when viewed in the direction of the thickness of the magnetic layers and which region reduces magnetic interaction occurring in the stacked magnetic layers, said intermediate region being one selected from the group consisting of a paramagnetic region having the same crystal structure as that of said ferromagnetic alloy thin film layer and a oxygen-rich region having oxygen concentration higher than that of said ferromagnetic alloy thin film layer. According to another aspect of the invention there is provided a magnetic recording apparatus having at least one magnetic recording medium of the present invention and at least one inductive head or at least one pair of magnetic heads for reading which heads use magneto-resistance effect and inductive head for writing.

A magnetic recording medium according to the first aspect of the present invention which medium has the intermediate region having the same crystal structure as that of the ferromagnetic layer is produced by the processes described below. Following the formation of a non-magnetic underlying layer on a substrate, a ferromagnetic layer comprising, for example, a Co—Cr—Ta alloy thin film having the hexagonal closest packed structure, is formed on the underlying layer. Then, a mainly paramagnetic Co—Cr—Ta alloy intermediate layer (having different compositions from those of the magnetic layer) also having the hexagonal closest packed structure is formed on the surface of the ferromagnetic layer. Furthermore, a ferromagnetic layer comprising a Co—Cr—Ta alloy is formed on the surface of the intermediate layer. By providing the paramagnetic intermediate layer having the same crystal structure as that of the ferromagnetic layers, it is possible to solve the problems that occur in a conventional magnetic medium due to the difference in crystal structure between the non-magnetic intermediate metal layer and the magnetic layers. The inventors of the present invention have found out that the degradation in magnetostatic characteristics of a conventional multilayered thin film magnetic medium occurs due to the degradation of the crystallinity of a ferromagnetic thin film alloy formed on a non-magnetic intermediate layer having a different crystal structure from that of the ferromagnetic alloy thin film. The present invention is based on this knowledge described above. The paramagnetic intermediate layer described above has not necessarily to be formed as a continuous layer. Isolated islands of the intermediate layer can also be used to achieve the same purpose described above. The non-magnetic underlying layer may be a Cr thin film or a thin film containing Cr as the main component. The main components of the magnetic layer may be selected from the group consisting of Co+Cr, Co+Ni, and Co+Ni+Cr. Preferably, the magnetic layer may further contain at least one additional component selected from the group consisting of Ta, Pt, Ti, Zr, and Hf. The total amount of the component or components other than Co is preferably in a range of 8 to 23 at. %. Instead of providing a single paramagnetic region when viewed in the direction regarding the thickness of the layers, in a case where a plurality of paramagnetic regions are formed in a multilayered fashion in the thickness direction of the recording medium (that is, in a state of multilayers each in parallel with the substrate of the medium), the noise of the recording medium is further reduced compared to that of the recording medium having a paramagnetic region formed by one in the thickness direction. Thus, in a case where a recording medium having low noise performance according to the present invention is used in a magnetic recording apparatus, then its signal-to-noise ratio can be improved compared to that of a conventional recording apparatus.

The improvement of the signal-to-noise ratio can be achieved not only when the magnetic recording medium according to the present invention is used in conjunction with a combination type magnetic head comprising inductive recording/reproducing magnetic heads, but also when it is used in conjunction with a separate type recording/reproducing magnetic head comprising both a read head using magneto-resistance effect and an inductive write head.

For the use in conjunction with a separate type magnetic head comprising a read head using magneto-resistance effect and an inductive write head, the signal-to-noise ratio of a magnetic recording apparatus using a magnetic medium according to the present invention can be improved in a case where in a magnetic medium the product of the residual magnetization Br (G) and the thickness t (μm) of the magnetic layer described above is in a range from 100 G·μm to 400 G·μm. For use in conjunction with a conventional type of inductive recording/reproducing head, signal-to-noise ratio can be also improved in a case where in a magnetic medium the above-described product is in another range from 150 G·μm to 280 G·μm.

The inventor of the present invention have found out that, in a case where at least one mainly paramagnetic region having a concentration of the component such as Cr larger than the concentration of Cr contained in the ferromagnetic film is disposed in the direction of the thickness of a magnetic recording medium, that is, in the direction parallel to the substrate of the medium, then the medium noise during recording/reproducing operations can be reduced because of the reduction of the magnetic interaction. Thus, this advantage is also brought about in a case where the structure comprising a non-magnetic underlying layer and magnetic thin film layers containing Co as the main component, which are formed on a substrate, is further provided with one or more mainly paramagnetic regions having a lower concentration of Co and having a higher concentration of Cr than those of the magnetic thin film layer between the magnetic thin film layers, which at least one paramagnetic region is disposed in the direction of the thickness of the structure (that is, in the direction parallel to the substrate of the medium). Namely, it becomes possible to obtain a magnetic recording medium in which a great reduction in noise is achieved. Thus, a magnetic recording apparatus using the magnetic recording medium having this structure can show a great reduction in noise. It has also been found out that in the structure comprising a plurality of mainly paramagnetic regions having a lower concentration of Co and having a higher concentration of Cr than those of the magnetic thin film layer, each of which regions is disposed between two adjacent magnetic thin film layers in the thickness direction of the structure, the magnetic interaction in the thickness direction is reduced and the medium noise during recording/reproducing operations can be more reduced, and this is effective to increase the capacity of a magnetic recording apparatus. This is mainly because the paramagnetic regions reduce the interaction between the ferromagnetic layers.

Two types of intermediate layers, which mainly exhibit paramagnetic performance, may be formed by adjusting the concentration of an additional component such as Cr contained in the Co alloy thin film during the process of forming the intermediate layers. For example, in a case where a Co-23 at. % Cr alloy thin film is produced under such film formation conditions (1) that these conditions make a Co-25 at. % Cr alloy thin film mainly paramagnetic, the obtained Co-23 at. % Cr alloy film can be a mixture of paramagnetic and ferromagnetic regions. In a case where the substrate temperature becomes higher or the discharging gas pressure becomes lower than in the film formation conditions (1), then the volume ratio of the regions having a lower Cr concentration than the average Cr concentration of the film will increase. By providing a mixture of ferromagnetic and paramagnetic layers through the mainly paramagnetic intermediate portions and/or by changing the volume ratio between the paramagnetic and ferromagnetic regions in such a manner described above, it is possible to reduce the magnetic interaction between the upper and lower magnetic layers. This tendency that the volume ratio of the ferromagnetic regions is varied depending on the conditions where the intermediate regions are formed is also observed in alloy thin films other than Co—Cr binary thin films. For example, when a few at. % of a third element is added thereto, a similar tendency can be observed. Thus, it is possible to select an intermediate region having an optimized composition which is suited well to the average atomic size of the underlying magnetic layer while taking lattice mismatching into consideration.

On the other hand, in a case where a Co-30 at. % Cr alloy thin film, having a higher Cr composition than the Co-25 at. % Cr alloy film described above, is formed under the thin film formation conditions (1), there is obtained a mixture of thin films of paramagnetic crystalline regions and non-magnetic amorphous regions. Although the volume of the amorphous regions becomes larger than that of the paramagnetic regions due to the "self shadowing effects" as described in "The Sputtering Phenomena" (Akira Kinbara, Tokyo-Daigaku Shuppan-kai, p. 181, (1984)), it is also possible to reduce the magnetic interaction between the upper and lower magnetic layers, by lowering the substrate temperature or by increasing the discharging gas pressure during the formation of the intermediate film, and by reducing the discharging gas pressure during the formation of the upper magnetic layer.

A Cr-based thin film is preferable to be used as the non-magnetic underlying layer, because after the subsequent formation of the magnetic thin films on this underlying layer, it is possible to have the axes of easy magnetization of the magnetic thin films mainly oriented in the direction parallel to the thin film.

To obtain a high signal-to-noise ratio in reproducing by using a recording medium according to the present invention combined with a magnetic read head using magneto-resistance effect, the product of the residual magnetization Br (G) and the thickness t (μm) of the above-described magnetic layers is, preferably, in the range from 100 G.·μm to 400 G.·μm, and more preferably, in the range from 150 G.·μm to 280 G.·μm. If the product of the residual magnetization Br (G) and the thickness t (μm) of the magnetic thin films exceeds 400 G.·μm, the signal-to-nose ratio will be reduced. On the other hand, if the product of the residual magnetization Br (G) and the thickness t (μm) of the magnetic thin films is less than 100 G.·μm, the output level will be reduced.

For use in conjunction with an inductive head, the product of the residual magnetization Br (G) and the thickness t (μm) of the above-described magnetic layers of a magnetic recording medium according to the present invention is, preferably, in the range from 100 G.·μm to 400 G.·μm, and more preferably, in the range from 300 G.·μm to 400 G.·μm. If the product of the residual magnetization Br (G) and the thickness t (μm) of the magnetic films is less than 100 G.·μm, the output level will be reduced.

A magnetic recording medium of the present invention which medium has at least one oxygen-rich region is produced by the processes explained below. Following the formation of a non-magnetic underlying layer on a substrate, a magnetic layer comprising, for example, a Co—Cr—Ta alloy thin film is formed on the underlying layer. Then, the surface of this magnetic layer is intentionally oxidized to form an oxide layer. Furthermore, a magnetic layer of a Co—Cr—Ta alloy is formed on the oxide layer. In the magnetic recording medium of the present invention, the oxide layer is used instead of a non-magnetic intermediate metal layer in conventional techniques. Alternatively, a plurality of high oxygen concentration regions may be arranged each of which is formed within a low oxygen magnetic alloy layer containing Co as the main component in such a manner that the low oxygen concentration regions are spaced apart from each other in the direction of the thickness of the magnetic alloy layers. Even if one of the high oxygen concentration regions is distributed non-uniformly within the magnetic thin film, the advantage thereof can be obtained.

Preferably, the above-described non-magnetic underlying layer is a Ni—P thin film, or a Cr thin film, or a thin film containing Cr as the main component.

The main components of the magnetic layer may be selected from the group consisting of Co+Cr, Co+Ni, and Co+Ni+Cr. Preferably, the magnetic layer may further contain at least one additional component selected from the group including Ta, Pt, Ti, Zr, and Hf. The total amount of the component or components other than Co is preferably in a range of 8–23 at. %.

When using the magnetic medium in a magnetic recording apparatus in which magnetic the medium is a product of the residual magnetization Br (G) and the thickness t (μm) of the magnetic layers is in a range of 100 G.·μm to 400 G.·μm, it is possible to obtain a magnetic recording apparatus having a improved signal-to-noise ratio in comparison with a conventional magnetic recording apparatus with respect to a case of an inductive head having been usually used as recording/reproducing head. Regarding a combination of the magnetic medium and a separate type magnetic head having a read head using magneto-resistance effect and an inductive write head, it is possible to obtain a magnetic recording apparatus having an improved signal-to-noise ratio in comparison with a conventional magnetic recording apparatus when a product of the residual magnetization Br (G) and the thickness t (μm) of the magnetic layers of the magnetic medium of the present invention is in a range of 150 G.·μm to 280 G.·μm.

The inventor of the present invention have found out that, in a case where a magnetic recording medium has at least one oxygen-rich region having high oxygen concentration between magnetic layers, the medium noise during recording/reproducing operations can be reduced. It can be understood that this noise reduction occurs because the high oxygen concentration regions reduce the magnetic interaction. This advantage is also brought about in a case of a structure of a magnetic recording medium produced by sequentially laminating a non-magnetic underlying layer and magnetic thin film layers containing Co as the main component while providing at least one oxygen-rich region between the low oxygen concentration within the magnetic thin film layer in the direction of the thickness of the magnetic thin layer, that is, a great reduction in noise can be obtained. It has also been found out that in the structure comprising a plurality of high oxygen concentration regions which are spaced apart from each other between low oxygen concentration regions within magnetic layers in the direction of the thickness of the magnetic layers, reduction of the magnetic interaction in the direction of the thickness of the magnetic layers occurs, and whereby a further reduction in the medium noise during recording/reproducing operations can be achieved. It can be understood that this effect occurs due to the reduction of the magnetic interaction occurring in the magnetic layers. Even if each of the high oxygen concentration regions is distributed non-uniformly within the magnetic layer, the reduction of the magnetic interaction in the direction of the thickness of the magnetic layers can occur, and thus the noise reduction can be achieved.

It is required that each of the magnetic layers, which contains Co+Cr, Co+Ni, or Co+Ni+Cr as the main components, contain at least one additional element selected from the group consisting of Ta, Zr, Hf, Ti, and Si. This is because the surface of the magnetic layer containing one of these elements can be oxidized more easily than that containing no such an element. The amount of the elements other than Co is preferably in a range of 8 to 23 at. %. Further, if the contents of the added elements selected from the group consisting of Cr, Ta, Zr, Hf, Ti, and Si become greater than 17 at. %, a magnetic coercive force portion normal to the medium plane becomes greater than that parallel to the medium plane, which is undesirable in the performance of the medium.

A Cr-based thin film is preferable to be used as the non-magnetic underlying layer, because after the subsequent formation of the magnetic films on this underlying layer, it is possible to have the axes of easy magnetization of the magnetic films oriented mainly in the direction parallel to the thin film plane.

For the use of a magnetic medium according to the present invention in conjunction with a read head using magnetoresistance effect, it is desirable for the product of the residual magnetization Br (G) and the thickness t (μm) of the magnetic layers to be in the range from 100 G·μm to 400 G·μm, more preferably in the range from 150 G·μm to 280 G·μm so as to obtain a high signal-to-noise ratio. If the product of the residual magnetization Br (G) and the thickness t (μm) of the magnetic layers is greater than 400 G·μm, the signal-to-noise ratio will be degraded. On the other hand, if the product of the residual magnetization Br (G) and the thickness t (μm) of the magnetic layers is less than 100 G·μm, the output level will be reduced.

For the use of a magnetic medium according to the present invention in conjunction with an inductive head, it is desirable for the product of the residual magnetization Br (G) and the thickness t (μm) of the magnetic layers to be in the range from 100 G·μm to 400 G·μm, more preferably in the range from 300 G·μm to 400 G·μm. The product of the residual magnetization Br (G) and the thickness t (μm) of the magnetic layers is required to be greater than 100 G·μm, because if the product of the residual magnetization Br (G) and the thickness t (μm) of the magnetic layer is less than 100 G·μm, then the output level will be reduced.

DETAILED DESCRIPTION

Figure 1:
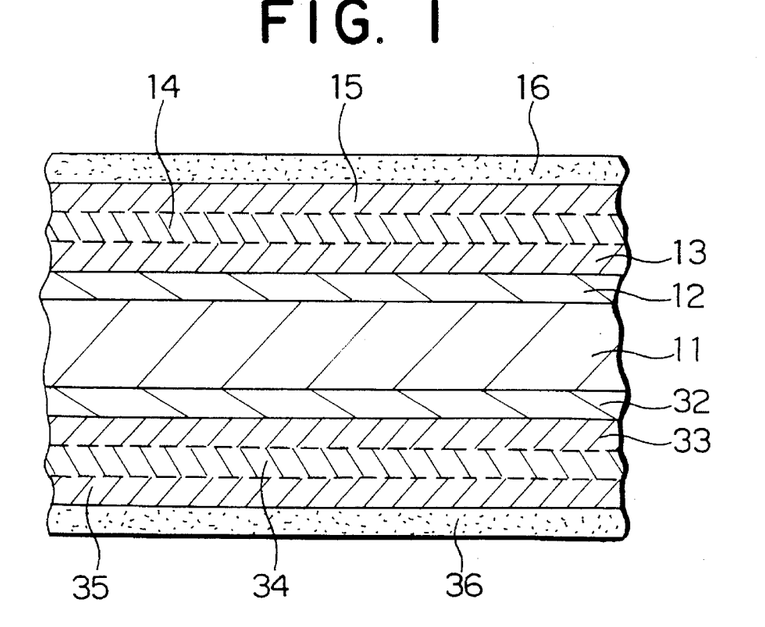
FIG. 1 is a cross-sectional view of a magnetic recording medium according to one embodiment of the present invention.

Referring to the following representative embodiments, the present invention will be described below.
EMBODIMENT 1:

FIG. 1 is a cross-sectional view of a magnetic recording medium according to one embodiment of the present invention. In FIG. 1, reference numeral 11 designates a substrate comprising tempered glass, plastic, or an aluminum alloy plated with Ni—P. Reference numerals 12 and 32 designate underlying metal layers comprising Ni—P, Cr, Mo, W, Cr—Ti, Cr—Si, or Cr—W. Reference numerals 13 and 33 designate lower magnetic layers comprising ferromagnetic alloy thin films containing Co+Cr, or Co+Ni, or Co+Ni+Cr as the main components and further containing at least one additional component selected from the group consisting of Ta, Pt, Ti, Zr, and Hf, that is, the lower magnetic layers 13 and 33 may preferably comprise Co—Ni—Cr, Co—Cr—Ta, Co—Cr—Pt, Co—Cr—Zr, Co—Cr—Hf, Co—Ni—Zr, Co—Ni—Ta, Co—Ni—Cr—Ti, or the like. Reference numerals 14 and 34 designate intermediate regions containing Co lower in concentration than that of the lower magnetic layers 13 and 33 and containing a second component such as Cr higher in concentration than that of the lower magnetic layers 13 and 33. Reference numerals 15 and 35 designate upper magnetic layers similar to the lower magnetic layers 13 and 33. Reference numerals 16 and 36 designate protection layers comprising C, B, $B_4C$, Si—C, $Co_3O_4$, $SiO_2$, $Si_3N_4$, W—C, Zr—W—C, or W—Mo—C—Ni. The present invention is applicable to a variety of diameters of disk, such as 10.8", 10.5", 9.5", 6.5", 5.25", 3.5", 2.5", 1.8", 1.3", and 1.0". There are no limitations in the outline or the shape of the disk.

The following description shows an example of the processes which were used to obtain the respective layers described above.

After plating both surfaces of a disk of an aluminum alloy containing 4% magnesium, having a diameter of 130 mm, an inner diameter of 40 mm, and a thickness of 1.9 mm, with 20 μm thick Ni-12 wt. % P, fine grooves in the form of substantially concentric circles were formed on the plated surfaces. After lapping the surfaces so that the center line average surface roughness became 10 nm, the surfaces were further lapped so that the thickness of the plated film of Ni-12 wt. % P became 15 μm. This kind of surface treatment is called texture processing. The directions of the textured grooves are not limited to the circumferential directions. Eccentric textured grooves may also be used to form a magnetic recording thin film medium on this substrate without any problems relating to the electromagnetic conversion performance, as long as the structure can prevent adhesion of a head.

The above-described substrate was cleaned and then dried. Then, using a thin film deposition equipment having an DC magnetron cathode, Ni—P was sputtered to form 50 nm thick underlying layers 12 and 32. Furthermore, 12 nm thick Co-15 at. % Cr-8 at. % Pt alloy thin film was formed as each of the lower magnetic layers 13 and 33. On the surfaces of these magnetic layers, 0.5 nm thick Co-20 at. % Cr-4 at. % Ta alloy intermediate layers 14 and 34 were formed. Subsequently, 12 nm thick Co—Cr—Pt films having the compositions same as those of the lower magnetic layers 13 and 33 were deposited to form upper magnetic layers 15 and 35. Then, C films are deposited to form protection layers 16 and 36. Lubricant such as perfluoroalkylpolyether was adhered onto the surfaces of C protection layers 16 and 36.

Figure 2:
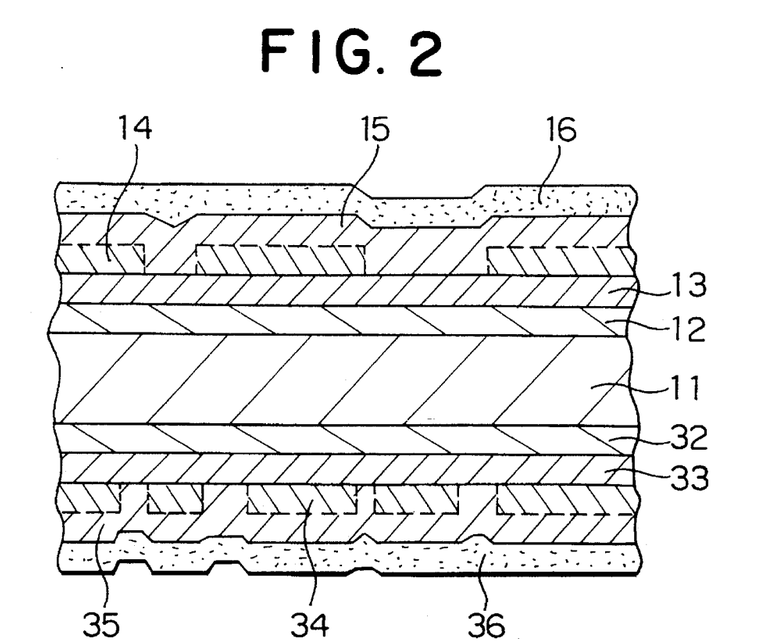
FIG. 2 is a cross-sectional view of a magnetic recording medium according to another embodiment of the present invention.

Samples were cut out from the obtained disk to observe their cross sections by using a transmission electron microscope. As shown in FIG. 2, each of the intermediate layers 14 and 34 did not have perfect continuity, and some island portions or separated portions were observed, and thus the lower magnetic layers 13 and 33 were partially in contact with the upper magnetic layers 25 and 35. In FIGS. 1 and 2, the intermediate layers 14 and 34 were depicted as if they were produced in the form of separated layers having clear boundaries. However, actual structures obtained according to the present invention also include regions which are not clearly separated.

COMPARISON EXAMPLE 1

For comparison with embodiment 1 regarding the performance, a sample of a medium comprising a magnetic monolayer protection film C, a magnetic layer (Co-15 at. % Cr-8 at. % Pt alloy), and an underlying Cr layer was produced.

Figure 4:
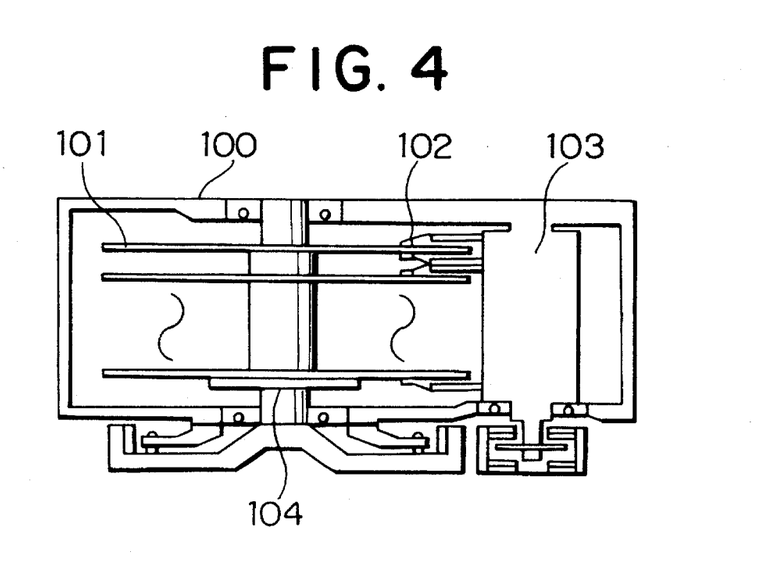
FIG. 4 is a schematic view of a magnetic recording apparatus using a magnetic recording medium according to the present invention.
Figure 5:
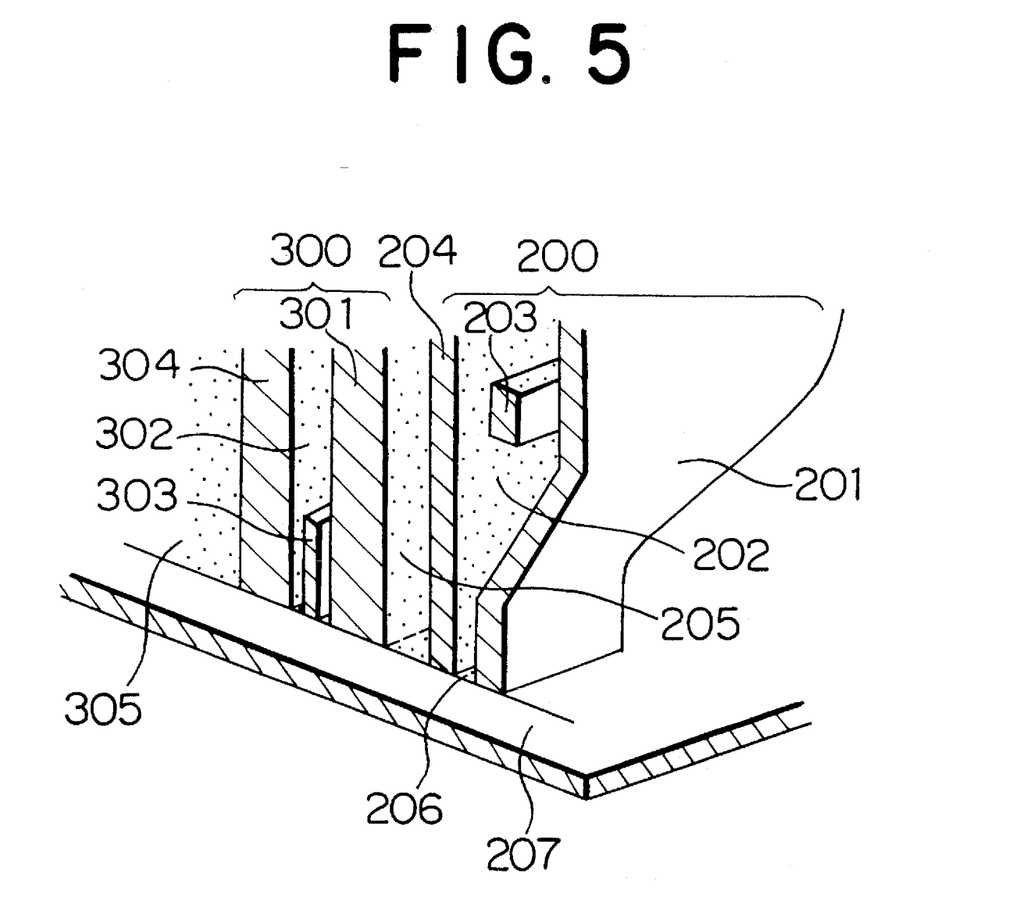
FIG. 5 is a schematic representation illustrating the relationship between a magnetic head and a magnetic recording medium according to the present invention.

Before the discussion on the comparison results, a magnetic recording apparatus according to the present invention will be described referring to FIGS. 4 and 5. FIG. 4 is a schematic view of a magnetic recording apparatus, or a magnetic disk storage unit, which is used to record or reproduce information on a magnetic recording medium or a magnetic disk according to the present invention. A plurality of disks 101 are fixed to a spindle 105 in such a manner that the disks 101 may be driven by spindle 105 to rotate at a high speed within a substantially closed space inside the magnetic disk storage unit 100, and the information is written or read to or from the disk by a magnetic head 102. A rotary actuator 103 positions the magnetic head 102 at a region available for recording the information on the magnetic disk 101. FIG. 5 is a schematic diagram illustrating a relationship between the magnetic head and the disk according to the present invention. The magnetic head shown in FIG. 5 comprises a recording head 200 and a reproducing head 300. The recording head 200 is similar to an inductive thin film magnetic head which has been used for both purposes of recording and reproducing in a conventional type disk storage unit. A magnetic circuit is formed through the upper magnetic core 201, the lower magnetic core 204, the magnetic gap 206, and the magnetic layers of the magnetic recording medium. Recording or reproducing of the information onto or from the magnetic disk 207 is performed by means of a current induced in a conducting coil 203. In this embodiment, this magnetic head is used as a dedicated recording head. The reproducing head 300 is a magnetoresistance-effect type magnetic head which operates by means of magnetoresistance effects. The magnetoresistance-effect type magnetic reproducing head 300 provides reproducing output by detecting the change in the resistance of the magnetoresistance-effect element 303. The upper shield film 301 and the lower shield film 304 shield the magnetoresistance-effect element 303 from the excess magnetic field via the non-magnetic insulating film 302. In this embodiment, the reproducing head 300 and the recording head 200 of the magnetic head 102 are formed successively on a substrate 305 via a non-magnetic insulating layer 205.

The magnetic recording media of embodiment 1 and comparison example 1 were applied to the magnetic disk storage unit, and the electromagnetic conversion characteristics of these media were evaluated by using the magnetoresistance-effect head. The magnitude of the single pulse waveform reproduced from the recording medium of embodiment 1 was the same as that of comparison example 1. However, when signals were recorded on both media with the same recording density, the disk noise occurring from the media of comparison example 1 was greater than that of embodiment 1 by 25%.

EMBODIMENT 2:

A recording medium according to embodiment 2 was produced as follows: after plating both surfaces of a disk comprising an aluminum alloy containing 4% magnesium, having a diameter of 130 mm, an inner diameter of 40 mm, and a thickness of 1.27 mm, with 20 μm thick Ni-12 wt. % P, the texture processing similar to that of embodiment 1 was performed.

This substrate was cleaned and then dried. Then, using the thin film deposition equipment, Cr was deposited to form 50 nm thick underlying layers 12 and 32. Furthermore, Co-11 at. % Cr-4 at. % Ta alloy was deposited to form a 13 nm thick lower magnetic layers 13 and 33. On the surfaces of these magnetic layers, 4 nm thick Co-21 at. % Cr-4 at. Ta alloy intermediate layers 14 and 34 were formed. Subsequently, 13 nm thick Co-11 at. % Cr-4 at. % Ta films having compositions same as those of the lower magnetic layers 13 and 33 were deposited to form upper magnetic layers 15 and 35. Then, C films were deposited to form protection layers 16 and 36. Lubricant such as perfluoroalkylpolyether was adhered onto the Surfaces of C protection layers 16 and 36.

COMPARISON EXAMPLE 2:

A recording medium for comparison was produced as follows: after plating both surfaces of a disk comprising an aluminum alloy containing 4% magnesium, having a diameter of 130 mm, an inner diameter of 40 mm, and a thickness of 1.27 mm, with 20 μm thick Ni-12 wt. % P, the texture processing similar to that of embodiment 1 was performed.

This substrate was cleaned and then dried. Then, using the thin film deposition equipment, Cr was deposited to form 50 nm thick underlying layers 12 and 32. Furthermore, Co-11 at. % Cr-4 at. % Ta alloy was deposited to form a 13 nm thick lower magnetic layers 13 and 33. Immediately after this process without oxidizing the surfaces of the lower magnetic layers 13 and 33, non-magnetic Cr was deposited to form 4 nm thick intermediate layers. Subsequently, 13 nm thick Co-11 at. % Cr-4 at. % Ta thin films having the compositions same as those of the lower magnetic layers 13 and 33 were deposited to form upper magnetic layers 15 and 35. Then, C films are deposited to form protection layers 16 and 36 having a thickness of 30 nm which is the same as that of embodiment 1. Lubricant such as perflucroalkylpolyether was adhered onto the surfaces of C protection layers 16 and 36.

The magnetic coercive force was evaluated for both multilayer media of embodiment 1 and example 2 for comparison by using a vibration-type magnetometer. The measured value of the magnetic coercive force for the multilayer media of embodiment 2 was 1460 Oe. However, the value for the second comparison sample having the non-magnetic Cr intermediate layers was as low as 1100 Oe.

EMBODIMENT 3:

A Cr—Ti alloy was deposited on a glass disk having a diameter of 3.5" and a thickness of 0.8 mm to form underlying layers 12, 32 in a manner similar to that in embodiment 1. Then, 20 nm thick magnetic layers 13 and 33 of Co-15 at. % Cr-8 at. % Pt alloy, 4 nm thick intermediate layers 14 and 34 of Co-23 at. % Cr-4 at. % Ta alloy, and 20 nm thick magnetic layers 15 and 35 of Co-10 at. % Cr-4 at. % Ta alloy were formed by using the processes similar to those used in embodiment 1 to produce a magnetic recording medium.

COMPARISON EXAMPLE 3

A comparison recording medium was produced in the same manner as in the case of embodiment 3 except that after forming magnetic layers 13 and 33 as in embodiment 3, 4 nm thick non-magnetic Cr intermediate layers were formed instead of the Co-25 at. % Cr-4 at. % Ta alloy intermediate layers, then magnetic layers 15 and 35 were formed.

From these disks, 8 mm×8 mm samples were cut out, and the crystal performances of the samples were evaluated by means of scanning of θ-2θ with a X-ray diffractometer. The 110 integrated diffraction intensity corresponding to the Co alloy magnetic layer having the hcp structure of the sample according to embodiment 3 was not less than 1.8 times greater than that of the sample of example 3 for comparison.

This means that in a case where the intermediate layers are formed in such a manner that the crystal structure of the intermediate layers are the same as that of the magnetic layers, the crystal quality of the upper magnetic layers can be improved.

Figure 3:
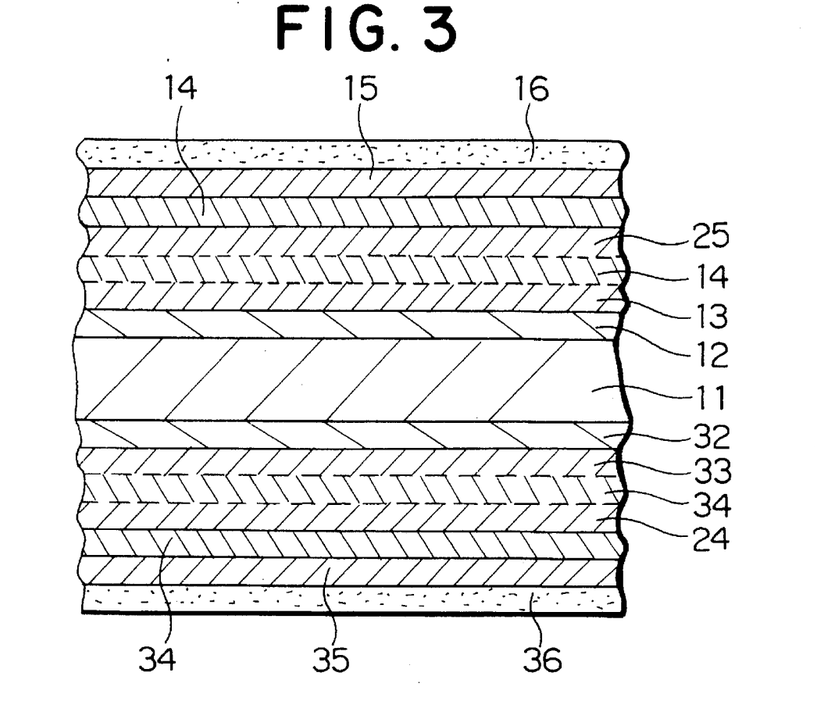
FIG. 3 is a cross-sectional view of a magnetic recording medium according to still another embodiment of the present invention.

EMBODIMENT 4:

FIG. 3 is a cross-sectional view of a magnetic recording medium according to another embodiment of the present invention. As shown in FIG. 3, by means of DC magnetron sputtering with in-line sputtering equipment, 50 nm thick Cr underlying layers 12 and 32 were formed on a glassy carbon substrate 11, and then 9 nm thick lower magnetic layers 13 and 33 of Co-12 at. % Cr-2 at. % Ta alloy, and 0.5 nm thick intermediate layers 14 and 34 of Co-23 at. % Cr-2 at. % Ta alloy were formed.

Furthermore, Co-12 at. % Cr-2 at. % Ta alloy magnetic layers 24 and 25 having a thickness same as that of the lower magnetic layers 13 and 33, and 0.5 nm thick intermediate layers 14 and 34 of Co-23 at. % Cr-2 at. % Ta alloy were formed. Then, Co-12 at. % Cr-2 at. % Ta upper magnetic layers 15 and 35 having a thickness same as that of the lower magnetic layers 13 and 33, and protection C layers 16 and 36 were further formed.

EMBODIMENT 5:

A magnetic recording medium was produced in the same manner as in embodiment 1 except that the thicknesses of the layers were modified so that the product of the thickness and the residual magnetization of the magnetic layers became 360 G·µm. The electromagnetic conversion characteristics of the obtained medium were evaluated by using an inductive head. A magnetic disk storage unit, similar to that shown in FIG. 4, which has an inductive reproducing head in the magnetic head 102, was used. The signals were recorded on each medium with the same recording density for the evaluation. The medium according to this embodiment showed reduction in the disk noise by about 22% than that of the medium having single-layer magnetic films, although the output level for the single pulse waveform was similar to that of the medium having single-layer magnetic films.

The magnetic recording medium obtained according to this embodiment was used in conjunction with a magnetic head comprising a combination of a magnetoresistance effect head and an inductive head, and a recording density as high as 70 kFCI or greater was achieved.

Figure 6:
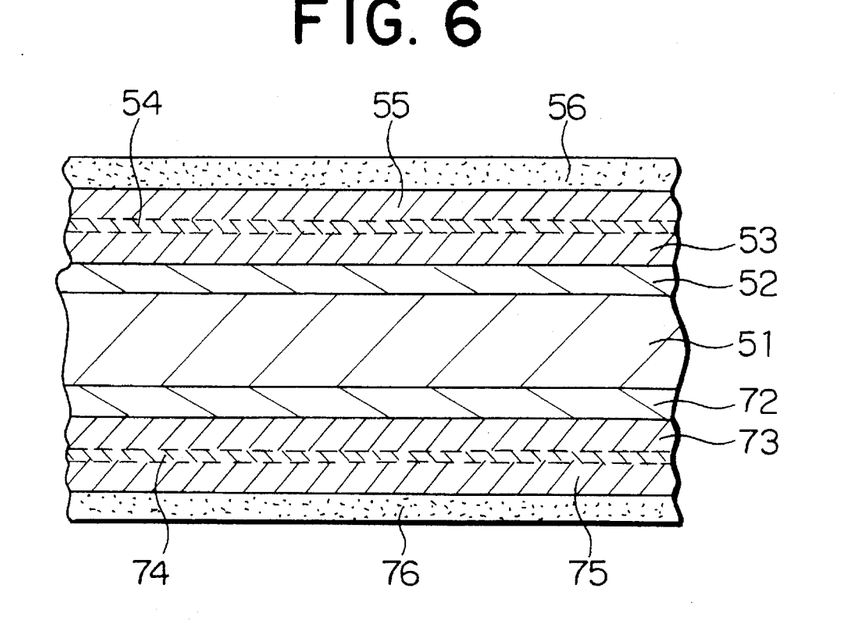
FIG. 6 is a cross-sectional view of a magnetic recording medium according to another embodiment of the present invention.

EMBODIMENT 6:

FIG. 6 is a cross-sectional view of a magnetic recording medium according to another embodiment of the present invention. In FIG. 6, reference numeral 51 designates a substrate comprising tempered glass, plastic, or an aluminum alloy plated with Ni—P. Reference numerals 52 and 72 designate underlying metal layers comprising Ni—P, Cr, Mo, W, Cr—Ti, Cr—Si, or Cr—W. Reference numerals 53 and 73 designate lower magnetic layers comprising ferromagnetic alloy thin films containing Co+Cr, Co+Ni, or Co+Ni+Cr as the main components and further containing at least one additional component selected from the group consisting of Ta, Pt, Ti, Zr, and Hf, that is, the lower magnetic layers 53 and 73 may comprise Co—Ni—Cr, Co—Cr—Ta, Co—Cr—Pt, Co—Cr—Zr, Co—Cr—Hf, Co—Ni—Zr, Co—Ni—Ta, Co—Ni—Cr—Ti, or the like. Reference numerals 54 and 74 designate oxygen-rich regions, the oxygen concentrations of which are intentionally increased compared to those of the lower magnetic layers 53 and 73. Reference numerals 55 and 75 designate upper magnetic layers similar to the lower magnetic layers 53 and 73. Reference numerals 56 and 76 designate protection layers comprising C, B, $B_4C$, Si—C, $Co_3O_4$, $SiO_2$, $Si_3N_4$, W—C, Zr—W—C, or W—Mo—C—Ni. The present invention is applicable to a variety of diameters of disk, such as 10.8", 10.5", 9.5", 6.5", 5.25", 3.5", 2.5", 1.8", 1.3", and 1.0". There are no limitations in the outline or the shape of the disk.

The following description shows an example of the processes which were used to obtain the respective layers described above.

An aluminum alloy disk similar to that used in embodiment 1 was used as a substrate and the same treatment was performed on this substrate as in embodiment 1.

The substrate was cleaned and then dried. Then, using the thin film deposition equipment having a DC magnetron cathode, Ni—P was sputtered to form 50 nm thick underlying layers 52 and 72. Furthermore, 12 nm thick Co-15 at. % Cr-8 at. % Pt alloy was deposited to form the lower magnetic layers 53 and 73. Then, oxygen gas was introduced to form oxide films 54 and 74 on the surfaces of these magnetic layers. Then, the disk was transferred into the chamber for the formation of the upper magnetic layers. Ar gas containing no oxygen gas or Ar gas containing oxygen of a controlled amount was introduced in this chamber, and 12 nm thick Co—Cr—Pt alloy thin films having the same compositions as those of the lower magnetic layers 53 and 73 were deposited to form upper magnetic layers 55 and 75. Then, C films are deposited to form protection layers 56 and 76. Lubricant such as perfluoroalkylpolyether was adhered onto the surfaces of C protection layers 16 and 36.

Figure 7:
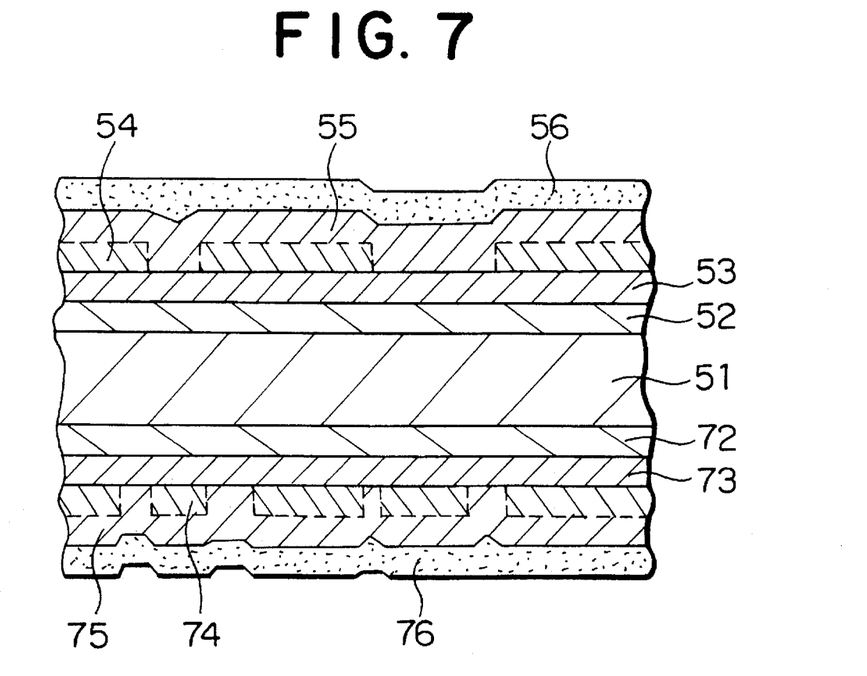
FIG. 7 is a cross-sectional view of a magnetic recording medium according to still another embodiment of the present invention.

Samples were cut out from the obtained disk to observe their cross sections by using a transmission electron microscope. As shown in FIG. 7, the intermediate layers 54 and 74 did not have perfect continuity, and some island regions or separated regions were observed, and thus the lower magnetic layers 53 and 53 were partially in contact with the upper magnetic layers 55 and 75. In FIGS. 6 and 7, the intermediate layers 54 and 74 were depicted as if they were produced in the form of separated layers having clear boundaries. However, actual structures obtained according to the present invention also include regions which are not separated clearly.

COMPARISON EXAMPLE 4

In embodiment 6 described above, the product (Br·tmag) of the thickness and the residual magnetization Br of the magnetic layer was decreased by about 4% compared to that obtained for the structure having single-layer magnetic films. A medium for comparison was produced by re-forming a medium of C/(Co-15 at. % Cr-8 at. % Pt)/Cr in which the magnetic layers were formed as a single-layer so that the product Br·tmag became the same as that for embodiment 6 which had a reduced value as described above. The performances of the obtained sample were compared to those of embodiment 6.

The evaluation was carried out by using the same magnetic disk storage unit as that shown in FIGS. 4 and 5 with slight difference that the magnetic recording media according to embodiment 6 were used in this case.

The magnetic recording media of embodiment 6 and comparison example 4 were applied to the magnetic disk storage unit described above, and the electromagnetic conversion characteristics of these media were evaluated by using the magnetoresistance-effect head. The magnitude of the single pulse waveform reproduced from the recording medium of embodiment 6 was the same as that of the comparison example 4. However, when signals were recorded on both media with the same recording density, the disk noise occurring from the media of the comparison example 4 was larger than that of embodiment 6 by 30%.

EMBODIMENT 7:

After plating both surfaces of a disk comprising an aluminum alloy containing 4% magnesium, having a diameter of 130 mm, an inner diameter of 40 mm, and a thickness of 1.27 mm, with 20 μm thick Ni-12 wt. % P, the texture processing similar to that of embodiment 1 was performed.

This substrate was cleaned and then dried. Then, using the thin film deposition equipment, Cr was deposited to form 50 nm thick underlying layers 52 and 72. Furthermore, Co-11 at. % Cr-4 at. % Ta alloy was deposited to form a 13 nm thick lower magnetic layers 53 and 73. Then, oxygen gas was introduced to form oxide films 54 and 74 on the surfaces of these magnetic layers. Then, 13 nm thick Co-11 at. % Cr-4 at. % Ta alloy thin films having the same compositions as those of the lower magnetic layers 53 and 73 were deposited to form upper magnetic layers 55 and 75. Then, C films are deposited to form 30 nm thick protection layers 56 and 76. Lubricant such as phenyxyamine etc. was adhered onto the surfaces of these C protection layers.

COMPARISON EXAMPLE 5

In order to produce a comparison example, a 13 nm thick Co-11 at. % Cr-4 at. % Ta alloy lower magnetic layers 53 and 73 were formed as in embodiment 7. Immediately after this process, without oxidizing the surfaces of these lower magnetic layers, non-magnetic Cr was deposited to form intermediate layers having a variety of thicknesses including 0.5, 1, 2, 4, and 8 nm. Subsequently, 13 nm thick Co-11 at. % Cr-4 at. % Ta alloy thin films having the same compositions as those of the lower magnetic layers 53 and 73 were deposited to form upper magnetic layers 55 and 75. Then, C films are deposited to form protection layers 56 and 76 having a thickness of 30 nm which is the same as that of embodiment 7. Lubricant such as phenyxyamine was adhered onto the surfaces of these C protection layers.

The residual magnetization and the magnetic coercive force were evaluated for these multilayer films by using a vibration-type magnetometer. As shown in Table 1, as the thickness of the non-magnetic Cr intermediate layer of the multilayer structure according to example 5 increases, both residual magnetization and magnetic coercive force decrease relative to those of the multilayer film according to embodiment 7.

TABLE 1

Residual Magnetization and Magnetic Coercive Force Measured by Vibration-Type Magnetometer

| Sample | Thickness of Intermediate Layer | Residual Magnetization | Coercive Force |
|---|---|---|---|
| Embodiment 7 | 0 nm | 8.0 kG | 1510 Oe |
| Example 5 | 0.5 nm | 7.4 kG | 1230 Oe |
|  | 1 nm | 7.4 kG | 1200 Oe |
|  | 2 nm | 7.5 kG | 1140 Oe |
|  | 4 nm | 7.4 kG | 1100 Oe |
|  | 8 nm | 7.5 kG | 790 Oe |

EMBODIMENT 8:

A Cr—Ti alloy was deposited on a glass disk having a diameter of 3.5" and a thickness of 0.8 mm to form underlying layers 52, 72 in a manner similar to that in embodiment 6. Then, magnetic layers 53 and 73 of Co-15 at. % Cr-8 at. % Pt alloy, and magnetic layers 55 and 75 of Co-10.5 at. % Cr-4 at. % Ta alloy were formed by using the processes similar to those used in embodiment 6 to produce a magnetic recording medium.

COMPARISON EXAMPLE 6

A recording medium was produced in the same manner as in the case of embodiment 8 except that just after forming magnetic layers 53 and 73 as in embodiment 8, magnetic layers 55 and 75 were directly formed thereon.

From these disks, 8 mm×8 mm samples were cut out, and δM of the samples were evaluated by using a vibrating sample magnetometer. The measurement of δM was carried out at 24° C. with the applied magnetic filed increasing in steps of 20 Oe up to 3000 Oe. The disk according to embodiment 8 showed the peak height of 0.7, and the peak height of the disk of example 6 was 1.2. This means that as described in Journal of Applied Physics, Vol. 69, pp. 4733–4735, magnetic interaction between magnetic layers of the disk according to the embodiment 8 became smaller as compared to that occurring in the medium of the comparison example 6.

EMBODIMENT 9

Figure 8:
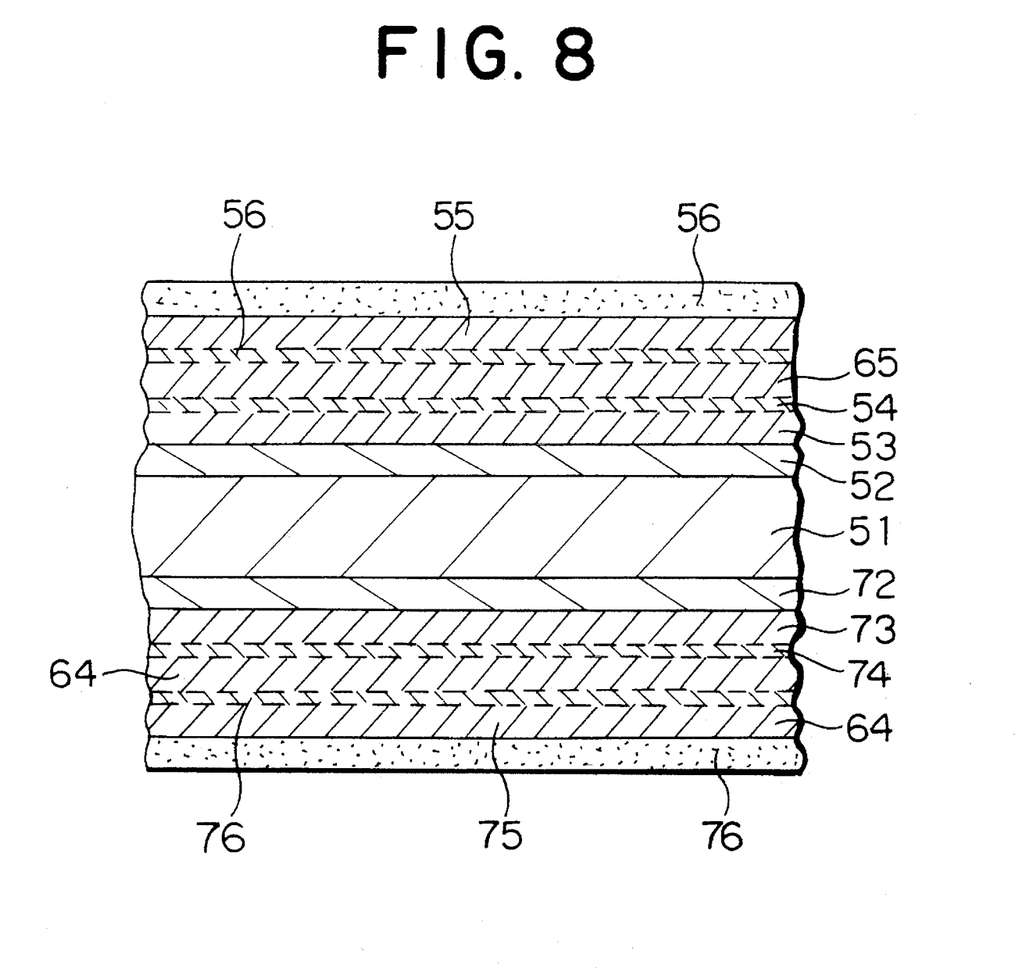
FIG. 8 is a cross-sectional view of a magnetic recording medium according to another embodiment of the present invention.

As shown in FIG. 8, by means of DC magnetron sputtering with in-line sputtering equipment, 50 nm thick Cr underlying layers 52 and 72 and then 9 nm thick lower magnetic layers 53 and 73 of Co-12 at. % Cr-2 at. % Ta alloy were successively formed on a glassy carbon substrate 51. Then, the surfaces the lower magnetic layers 53 and 73 were exposed for 2 min to the discharging ambient gas to form high oxygen concentration regions 54 and 74. Then, Co-12 at. % Cr-2 at. % Ta alloy magnetic layers 65 and 64 having the same thickness as that of the lower magnetic layers 53 and 73 were formed thereon, and the surfaces of these magnetic layers were then exposed for 2 min to the discharging ambient gas to form high oxygen concentration regions 56 and 76. Then, Co-12 at. % Cr-2 at. % Ta alloy upper magnetic layers 55 and 75 having the same thickness as that of the lower magnetic layers 53 and 73 were formed. Finally, C protection layers 56 and 76 were formed.

EMBODIMENT 10:

A magnetic recording medium was produced in the same manner as in embodiment 6 except that the thicknesses of the layers were modified so that the product of the thickness and the residual magnetization of the magnetic layer became 360 G·μm. The electromagnetic conversion characteristics of the obtained medium was evaluated by using an inductive head as in embodiment 6. A magnetic disk storage unit, similar to that shown in FIG. 4, which has an inductive reproducing head in the magnetic head 102, was used. The signals were recorded on each medium with the same recording density for the evaluation. The medium according to this embodiment showed a reduction in the disk noise by about 25% in comparison with that of the medium having single-layer magnetic films, although the output level for the single pulse waveform was similar to that of the medium having single-layer magnetic films.

The magnetic recording medium obtained according to this embodiment was used in conjunction with a magnetic head comprising a combination of a magnetoresistance-effect head and an inductive head, as shown in FIG. 5, and a recording density as high as 70 kFCI or greater was achieved.

As described above, if a magnetic recording medium is used, it is possible to realize a magnetic storage device which provides a high recording density which can not be achieved by conventional multilayered magnetic recording media.

According to the present invention, as described above, it is possible to obtain a magnetic recording medium which provides a high recording density and low disk noise without degradation of magnetostatic performances and crystallinity, and without decreasing the residual magnetization. A magnetic storage device operating in conjunction with a magnetic recording medium according to the present invention provides a high recording capacity and a high signal-to-noise ratio.

What is claimed is:

1. A magnetic recording medium comprising:
   a substrate;
   a non-magnetic underlying layer formed on the substrate;
   a plurality of stacked ferromagnetic alloy thin film layers each containing Co and at least one additional element selected from the group consisting of Cr and Ni, wherein a first one of the ferromagnetic alloy thin film layers is disposed on said non-magnetic underlying layer and another one of said plurality of ferromagnetic alloy thin film layers is disposed over said first ferromagnetic alloy thin film layer; and
   an intermediate region laminated on said first one of the ferromagnetic alloy thin film layers, which intermediate region reduces magnetic interaction occurring in the stacked ferromagnetic alloy thin film layers,
   said intermediate region being one selected from the group consisting of a paramagnetic region having the same crystal structure as that of said first ferromagnetic alloy thin film layer and a region having an oxygen concentration higher than that of said first ferromagnetic alloy thin film layer.

2. A magnetic recording medium comprising:
   a substrate;
   a non-magnetic underlying layer formed on the substrate;
   a plurality of stacked ferromagnetic alloy thin film layers each containing Co and at least one additional element selected from the group consisting of Cr and Ni, wherein a first one of the ferromagnetic alloy thin film layers is disposed on said non-magnetic underlying layer and another one of said plurality of ferromagnetic alloy thin film layers is disposed over said first ferromagnetic alloy thin film layer; and
   a mainly paramagnetic intermediate region laminated on said first one of the ferromagnetic alloy thin film layers, which intermediate region reduces magnetic interaction occurring in the stacked ferromagnetic alloy thin film layers, said intermediate region being made to contain the same crystal structure as those of the ferromagnetic alloy thin film layers and to contain both a Co content lower than that of said first ferromagnetic thin film alloy layer and said additional element in a content larger than that of the ferromagnetic alloy layer.

3. A magnetic recording medium as claimed in claim 2, wherein a content of the at least one additional element is 8 to 23 at. %.

4. A magnetic recording medium according to claim 2, wherein the paramagnetic region comprises a plurality of discontinuous islands isolated from each other and disposed within the magnetic layer.

5. A magnetic recording medium according to claim 2, wherein said non-magnetic underlying layer comprises a thin film containing Cr as the main component, and main components of said magnetic layers are components selected from the groups consisting of Co+Cr, Co+Ni, and Co+Ni+ Cr, and said magnetic layers further contain at least one additional component selected from the group consisting of Ta, Pt, Ti, Zr, and Hf.

6. A magnetic recording medium according to claim 2, wherein the product of the residual magnetization Br and the thickness t of said magnetic layers is in the range from 100 G·μm to 400 G·μm.

7. A magnetic recording medium according to claim 2, wherein the product of the residual magnetization Br and the thickness t of said magnetic layers is in the range from 150 G·μm to 280 G·μm.

8. A magnetic storage device comprising:
   at least one magnetic recording medium including,
      a substrate,
      a non-magnetic underlying layer formed on the substrate,
      a plurality of stacked ferromagnetic alloy thin film layers each containing Co and at least one additional element selected from the group consisting of Cr and Ni, wherein a first one of the ferromagnetic alloy thin film layers is disposed on said non-magnetic underlying layer and another one of said plurality of ferromagnetic alloy thin film layers is disposed over said first ferromagnetic alloy thin film layer, and
      a mainly paramagnetic intermediate region laminated on said first one of the ferromagnetic alloy thin film layers, which intermediate region reduces magnetic interaction occurring in the stacked ferromagnetic alloy thin film layers, said intermediate region being made to contain the same crystal structure as those of the ferromagnetic alloy thin film layers and to contain both a Co content lower than that of said first ferromagnetic alloy thin film layer and said additional element in a content larger than that of said first ferromagnetic alloy thin film layer;
   at least one a magnetic read head using magnetic resistance effects; and
   at least one an inductive write head.

9. A magnetic storage device comprising:
   at least one magnetic recording medium including,
      a substrate,
      a non-magnetic underlying layer formed on the substrate,
      a plurality of stacked ferromagnetic alloy thin film layers each containing Co and at least one additional element selected from the group consisting of Cr and Ni, Wherein a first one of the ferromagnetic alloy thin film layers is disposed on said non-magnetic underlying layer and another one of said plurality of ferromagnetic alloy thin film layers is disposed over said first ferromagnetic alloy thin film layer, and
      a mainly paramagnetic intermediate region laminated on said first one of the ferromagnetic alloy thin film layers, which intermediate region reduces magnetic interaction occurring in the stacked ferromagnetic alloy thin film layers, said intermediate region being made to contain the same crystal structure as those of the ferromagnetic alloy thin film layers and to contain both a Co content lower than that of said first ferromagnetic alloy thin film layer and said additional element in a content larger than that of said first ferromagnetic alloy thin film layer; and
   at least one inductive head.

10. A magnetic recording medium comprising:
    a substrate;
    a non-magnetic underlying layer formed on said substrate;

a plurality of stacked ferromagnetic alloy thin film layers each containing Co and at least one additional element selected from the group consisting of Cr and Ni, wherein a first one of the ferromagnetic alloy thin film layers is disposed on said non-magnetic underlying layer and another one of said plurality of ferromagnetic alloy thin film layers is disposed over said first ferromagnetic alloy thin film layer; and at least one region disposed between said first and said another ferromagnetic alloy thin film layers which region contains oxygen in a concentration higher than that of the first ferromagnetic alloy thin film layer.

11. A magnetic recording medium according to claim 10, wherein said high oxygen concentration region is non-uniformly distributed between said magnetic layers.

12. A magnetic recording medium according to claim 10, wherein said non-magnetic underlying layer is a thin Cr film or a thin film containing Cr as the main component.

13. A magnetic recording medium according to claim 10, wherein the main components of said magnetic layers are components selected from the groups consisting of Co+Cr, Co+Ni, and Co+Ni+Cr, and said magnetic layers further contain at least one additional component selected from the group consisting of Ta, Pt, Ti, Zr, and Hf.

14. A magnetic recording medium according to claim 10, wherein the product of the residual magnetization Br and the thickness t of said magnetic layers is in the range from 100 G·μm to 400 G·μm.

15. A magnetic recording medium according to claim 10, wherein the product of the residual magnetization Br and the thickness t of said magnetic layers is in the range from 150 G·μm to 280 G·μm.

16. A magnetic storage device comprising:

at least one magnetic recording medium including,
a substrate,
a non-magnetic underlying layer formed on said substrate,
a plurality of stacked ferromagnetic alloy thin film layers each containing Co and at least one additional element selected from the group consisting of Cr and Ni, wherein a first one of the ferromagnetic alloy thin film layers is disposed on said non-magnetic underlying layer and another one of said plurality of ferromagnetic alloy thin film layers is disposed over said first ferromagnetic alloy thin film layer, and at least one region disposed between said first and said another ferromagnetic alloy thin film layers which region contains oxygen in a concentration higher than that of the first ferromagnetic alloy thin film layer;

at least one a magnetic read head using magnetoresistance effects; and an inductive write head.

17. A magnetic storage device comprising:

at least one magnetic recording medium including,
a substrate,
a non-magnetic underlying layer formed on said substrate,
a plurality of stacked ferromagnetic alloy thin film layers each containing Co and at least one additional element selected from the group consisting Cr and Ni, wherein a first one of the ferromagnetic alloy thin film layers is disposed on said non-magnetic underlying layer and another one of said plurality of ferromagnetic alloy thin film layers is disposed over said first ferromagnetic alloy thin film layer, and
at least one region disposed between said first and said another ferromagnetic alloy thin film layers which region contains oxygen in a concentration higher than that of the first ferromagnetic alloy thin film layer; and at least one an inductive head.

* * * * *

UNITED STATES PATENT AND TRADEMARK OFFICE
CERTIFICATE OF CORRECTION

PATENT NO. : 5,587,235
DATED      : December 24, 1996
INVENTOR(S): Hiroyuki Suzuki et al It is certified that error appears in the above-indentified patent and that said Letters Patent is hereby corrected as shown below:

| Column | Line |  |
|--------|------|--|
| 3  | 60 | Change "inventor" to --inventors--. |
| 6  | 18 | Change "inventor" to --inventors--. |
| 7  | 49 | After "invention." delete "and". |
| 16 | 47 | Change "Wherein" to --wherein--. |

Signed and Sealed this

Seventeenth Day of June, 1997

Attest:

BRUCE LEHMAN

Attesting Officer

Commissioner of Patents and Trademarks